3,127,392
HYDROXYALKYLATION OF AMYLOSE SUSPENSION AND PRODUCT PRODUCED THEREBY
Earl Eugene Fisher and Reedus Ray Estes, Decatur, Ill., assignors to A. E. Staley Manufacturing Company, Decatur, Ill., a corporation of Delaware
No Drawing. Filed Oct. 27, 1960, Ser. No. 65,295
17 Claims. (Cl. 260—233.3)

This invention is concerned with hydroxyalkyl amylose and with the hydroxyalkylation of amylose suspensions with vicinal epoxy compounds.

It is well-known that starch can be fractionated into two major fractions called amylose and amylopectin. Amylose is the straight chain portion of starch while amylopectin is the branched chain portion of starch. Various techniques have been developed to fractionate starch and this invention is directed to the amylose fraction of starch.

It is known that on cooling, aqueous pastes of unmodified starch above about 3.5% solids concentration set up and form a rigid gel or lose the ability to flow freely. At about the same time the phenomenon called "retrogradation" takes place. This involves the formation of a water-insoluble solid material, which will not redisperse in water. This property of gelling is very pronounced in pure amylose solutions. Even 1% pastes or solutions of amylose will gel and deposit practically the whole solute in the form of crystalline sediment in the course of a few days.

French Patent 1,204,376 discloses broadly the concept of etherifying aqueous solutions of amylose, where the amylose has been dissolved in water by boiling under pressure or else heated in the presence of a peptizing agent. The only specific example of the preparation of an amylose ether in this patent is the reaction of amylose with dimethyl sulfate in a highly alkaline aqueous medium, which pastes the amylose. The amylose ether is then isolated by evaporating off the water on hot rolls.

Although hydroxyalkyl starches and the hydroxyalkylation of starch suspensions are both well-known, no hydroxyalkyl starches are known which form continuous films having either good flexibility or high tensile strength. Further, the hydroxyalkylation of starch in aqueous alkaline suspensions has been limited to reaction mixtures wherein less than 0.2 mole of alkylene oxide per mole of starch is present, since the starch loses its granular form when more than 0.2 mole of alkylene oxide per mole of starch is reacted with starch. One object of this invention is to prepare a non-retrograding, non-gelling, cold water-soluble hydroxyalkyl amylose, which forms continuous films having good flexibility and high tensile strength, by reaction of a suspension of amylose with an alkylene oxide. A further object is to prepare a hydroxyalkyl amylose, which not only can be isolated without the use of costly techniques, such as spray drying or precipitation, but also can be readily put into aqueous solution in starch cooking equipment, said hydroxyalkyl amylose solution having little or no tendency to retrograde or to gel on cooling to room temperature.

In one aspect, this invention is an initially water-insoluble hydroxyalkyl amylose film, which dissolves in boiling water. The hydroxyalkyl amylose has a molar substitution between about 0.15 and 0.39.

In a second aspect, this invention is a hydroxyalkyl amylose film, which is water-soluble at room temperature, having a molar substitution of at least about 0.40.

In a third aspect, this invention is a film-forming, cold water-soluble hydroxyalkyl amylose, which has little or no tendency to gel or retrograde when dissolved in water at room temperature.

In a fourth aspect, this invention is an initially water-insoluble, hydroxyalkyl amylose, which can be rendered water-soluble at temperatures in excess of 100° C., and when so solubilized has little or no tendency to gel or retrograde on cooling to room temperature. The hydroxyalkyl amylose solution may be spray dried forming a cold water-soluble hydroxyalkyl amylose powder or it can be cast directly to prepare hydroxyalkyl amylose films.

In a fifth aspect, the invention is a method of reacting an alkylene oxide with an alkaline suspension of amylose in order to form an initially water-insoluble hydroxyalkyl amylose.

In another aspect, the invention is a method of preparing a film-forming, cold water-soluble hydroxyalkyl amylose powder. This product is prepared by dissolving initially water-insoluble hydroxyalkyl amylose in water at temperatures in excess of 100° C. and then isolating a cold water-soluble product either by precipitation with organic materials or evaporation of the water on hot rolls or by spray drying.

In still another aspect, the invention is a method of forming films from initially cold water-insoluble hydroxyalkyl amylose or from cold water-soluble hydroxyalkyl amylose by dissolving either in water and then casting as films.

In somewhat greater detail, the hydroxyalkyl amylose of this invention is prepared by bringing an epoxy compound into contact with amylose in suspension in the presence of an alkaline catalyst. The reaction mixture is heated at a temperature of from 30° C. to 90° C. for approximately 1 to 24 hours, and the catalyst is then neutralized. The resulting hydroxyalkyl amylose is then isolated.

The hydroxyalkyl amylose, which is substantially water-insoluble at this point, may be partitioned from the suspension medium by filtering or centrifuging. This step may be characterized as the "solvent change" partitioning step. After washing, the water-insoluble hydroxyalkyl amylose particles may be dissolved in water by suspending the water-insoluble hydroxyalkyl amylose in water and then heating to between 100° C. and 200° C. The hydroxyalkyl amylose, which is now water-soluble, can be partitioned from water-insolubles by filtering or centrifuging. The hydroxyalkyl amylose can then be recovered from the aqueous solution as a cold water-soluble product or as a film. The specific steps and modifications of this process will become clearer as the description proceeds.

REACTANTS

The amylose used in the aforementioned suspension may be in a crystalline form, a spray-dried form, or in an amorphous form. The crystalline form can be prepared by any technique, such as those discussed in Kerr, Chemistry and Industry of Starch, second edition, 1950. The spray-dried form, which may be partly crystalline and partly amorphous, is prepared by heating the crystalline form in the presence of water to approximately 150° C. in an autoclave and spray-drying the resulting amylose solution. A substantially amorphous amylose is prepared by precipitating the amylose from aqueous solution with acetone. The crystalline amylose, spray-dried amylose and amorphous amylose may be prepared from the amylose fraction of any native starch or modified native starch. It is immaterial, for the purpose of this invention, whether the amylose fraction is from corn starch, potato starch, wheat starch, rice starch, tapioca starch, sago starch, etc. The modified starches include hypochlorite-oxidized starch, enzyme treated starch, acid-treated starch, etc.

The alkylene oxides used in this invention may be characterized as vicinal epoxy compounds wherein the epoxy group is attached to adjacent carbon atoms. Included among these compounds are ethylene oxide, 1,2-propylene oxide, 1,2-butylene oxide, 2,3-butylene oxide, etc. At least 0.20 mole of alkylene oxide per mole of amylose must be present in the reaction vessel in order to get a hydroxyalkyl amylose having a molar substitution of at least 0.15. While the molar ratio of alkylene oxide to amylose may be as high as 8:1 or higher, we have found that when low concentrations of catalyst are used, the highest molar substitution occurs when from two to four moles of alkylene oxide are used for each mole of amylose. The catalyst concentration, duration of the reaction, temperature of the reaction, the presence of oxygen in the reaction vessel, and the specific alkylene oxide all affect the reaction of alkylene oxide with amylose. Simple experiments may be run to determine, for particular conditions, the mole ratio of alkylene oxide to amylose necessary. The numerous examples set forth in this specification illustrate the wide range of effective operating conditions.

The alkaline catalyst for this reaction may be any solvent-soluble alkaline material. The catalyst may be an alkali metal hydroxide, such as sodium hydroxide and potassium hydroxide; an alkaline earth hydroxide, such as calcium hydroxide and barium hydroxide; a tetraalkyl ammonium hydroxide, such as tetramethyl ammonium hydroxide; a tetraalkyl phosphonium hydroxide, such as tetraethyl phosphonium hydroxide; pyridine; an alkali metal alcoholate, such as sodium alcoholate and potassium alcoholate, etc. For each mole of amylose reacted, at least .04 mole of alkaline catalyst is necessary. When the catalyst concentration drops below .04 mole per mole of amylose, the resultant hydroxyalkyl amylose, after dissolving in water at elevated temperatures, has a tendency to gel on cooling to room temperature. While a catalyst concentration as low as .04 mole per mole of amylose may be employed, it is preferable to use approximately .08 mole of catalyst per mole of amylose in order to get the best results. When the catalyst concentration is less than .08 mole per mole of amylose, oxygen has a decided effect on the reaction. Under the conditions of the alkylation reaction, the oxygen present in the reaction vessel appears to oxidize the amylose. Such oxidation of amylose discolors the amylose to an extent dependent on the amount of oxygen present. More important, the carboxyl groups of the oxidized amylose appear to neutralize the catalyst with the attendant curtailment of the reaction. When the reaction fails to go to completion, the hydroxyalkyl amylose formed does not have the desired properties and its aqueous solutions tend to gel when at room temperature. On the other hand, when .08 mole catalyst per mole of amylose is used, the reaction can tolerate the presence of dissolved oxygen in the solvent as well as varying amounts of oxygen from the atmosphere without significant curtailment of the reaction. However, it is usually preferable to keep the oxygen concentration within the reaction vessel at a minimum in view of the aforementioned possibility of discoloration.

Catalyst concentrations above .08 mole per mole of amylose may be used. However, it is preferable to use as low a catalyst concentration as possible in order to reduce the amount of water-soluble or water-insoluble salts formed when the catalyst is neutralized. The presence of excess salts in the hydroxyalkyl amylose film reduces the tensile strength of the film. Although the concentration of salts may be reduced by partitioning, which is discussed in detail below, it is economically desirable to avoid such additional steps. With relatively pure amylose, a low concentration of catalyst permits avoiding both partitioning steps; when crude amylose is used, the first partitioning step can be avoided. This cuts down the cost of the product without sacrificing its quality.

Any mineral acid or organic acid may be used to neutralize the catalyst. It is usually preferable to use strong acids, such as hydrochloric acid, sulfuric acid, benzenesulfonic acid and phosphoric acid. However, acetic acid has been quite effective. While most of these acids form water-soluble salts when neutralizing the aforementioned alkaline catalysts, sulfuric acid neutralizes barium hydroxide forming a highly water-insoluble salt. When crude amylose is hydroxyalkylated using barium hydroxide as the catalyst and sulfuric acid as the neutralizing acid, the concentration of the catalyst may be considerably above .08 mole per mole of catalyst, since crude amylose contains other water-insolubles, which should be removed by partitioning the water-soluble hydroxyalkyl amylose, as discussed in detail below. On the other hand when an organic polar solvent is used as the suspending liquid, the catalyst and neutralizing acid used should be selected in order to form a water-soluble salt on neutralization, since the water-soluble salt will be removed in the solvent change partitioning step. Sodium hydroxide and hydrochloric acid have been used together very effectively. The concentration of the alkaline catalyst is accordingly not critical where an organic polar solvent is used. Concentrations as high as .8 mole of alkaline catalyst per mole of amylose have been used quite effectively.

The suspension medium for the reaction can be any polar solvent in which the epoxy compound is soluble. The preferred polar solvents are water; alcohols, particularly lower alkyl alcohols of 1 to 6 carbon atoms such as methanol, ethanol, 2-propanol, butanol, etc.; and ethers, such as dioxane. Of these, water is most preferable because of economic considerations. We have also found that when an organic solvent is used to suspend the amylose, a small quantity of water acts as a catalyst, and increases the molar substitution of the hydroxyalkyl amylose.

PROCESS

More specifically, the hydroxyalkyl amylose of this invention is prepared by adding the epoxy compound to an alkaline suspension of amylose. In view of the gaseous state and high vapor pressure at room temperature of some alkylene oxides, such as ethylene oxide (B.P. 11° C.), the alkylene oxide is either bubbled through the suspension or else liquefied before it is added to the reaction vessel. The reaction mixture may be cooled below the boiling point of the alkylene oxide, if desired. Although it is preferable, because of the low boiling point of some alkylene oxides, to add the alkaline catalyst and amylose to the suspension medium prior to the addition of the alkylene oxide, the catalyst and/or amylose may be added to the suspension medium after the alkylene oxide is added. This reaction may be run in an open vessel or in a closed vessel. When an open vessel is used, allowance must be made for any loss of alkylene oxide from the reaction vessel.

The hydroxyalkylation reaction is preferably carried out for from about 1 to 24 hours at between 30° C. and 80° C. At temperatures between 0° C. and 30° C., the reaction is quite slow and requires a relatively large quantity of catalyst. At temperatures between 80° C. and 90° C., the hydroxyalkyl amylose is noticeably swollen and hard to filter. Above 90° C., the hydroxyalkyl amylose is so swollen that partitioning is virtually impossible.

When a polar organic solvent is used to suspend the amylose, the reaction mixture, which has been maintained at a temperature of from 30° C. to 90° C. for approximately 1 to 24 hours, is neutralized with an acid to a pH of between 6 and 8. At this point the hydroxyalkyl amylose is substantially insoluble in water. The product is separated by filtration or centrifuging and then washed with water. As previously stated, this step is the "solvent change" partitioning step. During the washing, essentially all water-soluble impurities in the amylose and water-soluble salts formed by the neutralization of the catalyst are removed. This product can be sold without further treatment to the manufacturer of films, etc. who carries out the remaining steps in the process. The washed, water-insoluble, hydroxyalkyl amylose is then dispersed in about 5 to 20 times its weight of water and rapidly heated to from 100° C. to 150° C. or higher. After a short time (1 second to 15 minutes) at this temperature, the hydroxyalkyl amylose suspension is converted to a non-gelling aqueous solution of hydroxyalkyl amylose, and the solution is cooled to room temperature. The temperature required to solubilize the hydroxyalkyl amylose suspension decreases as the molar substitution of the hydroxyalkyl amylose increases. Any water-insoluble solid impurities in the starting amylose and water-insoluble salts formed during the neutralization of the catalyst may be removed from the hydroxyalkyl amylose solution at this point by a second partitioning step, for example, by filtering or centrifuging the insolubles from the solution.

As is apparent from the foregoing, the two separation steps enable us to prepare relatively pure hydroxyalkyl amylose from impure amylose without difficulty. Likewise, these two separation steps permit the use of large quantities of catalyst without any salt contamination of hydroxyalkyl amylose. Water-insoluble solid impurities in the amylose fraction used to make the hydroxyalkyl amylose of this invention and water-insoluble salts from the neutralized catalyst are readily removed from the aqueous hydroxyalkyl amylose solution by partitioning. Likewise, any water-soluble impurities in the amylose and any water-soluble salts from the neutralized catalyst are easily removed in the solvent-change partitioning step, immediately following the neutralization step.

While the procedure set forth in the preceding paragraphs may be followed when water is used as the polar suspending liquor, it is preferable, when carrying out the whole process in one plant, to simplify this procedure by omitting the solvent change partitioning step. This step can be omitted, since even relatively crude amylose has a low concentration of water-soluble impurities. Furthermore, at the conclusion of the reaction, the hydroxyalkyl amylose is dispersed in water, and this dispersion is immediately useful in the next step. Accordingly, the neutralized aqueous suspension of hydroxyalkyl amylose is rapidly heated in an autoclave to a temperature of from about 100° C. to 150° C. or higher until a non-gelling, hydroxyalkyl amylose solution is formed as described before. Any water-insoluble solid impurities may be removed from the hydroxyalkyl amylose solution by partitioning at this point, as by filtration, centrifugation, etc.

It is evident from the preceding paragraph that the aqueous hydroxyalkylation system is dependent upon the selection of catalyst concentrations and/or the combination of catalyst and neutralizing acid, which will permit the omission of the solvent-change partitioning step. As stated previously, in the discussion of the catalyst and neutralizing acid, the solvent change partitioning step can be advantageously omitted when the catalyst concentration is low (approximately 0.04 mole catalyst per mole of amylose up to 0.16 mole of catalyst per mole of amylose) or when the catalyst and neutralizing acid are selected in such a way that they form a water-insoluble salt.

Whether water or a polar organic solvent has been used, and whether the aqueous solution produced by the high-temperature treatment is filtered or not, a cold water-soluble hydroxyalkyl amylrose powder is recovered from the solution by precipitation with an organic material, such as acetone, or by evaporating the water on hot rolls or by spray drying, etc. Instead of isolating the hydroxyalkyl amylose as a powder, it may be cast directly into a film.

The hydroxyalkyl amylose products of this invention are classified in four distinct types which are: initially water-insoluble products, which can be rendered water-soluble at temperatures in excess of 100° C.; cold water-soluble hydroxyalkyl amyloses; water-soluble hydroxyalkyl amylose films; and initially water-insoluble films, which dissolve in boiling water. The initially water-insoluble hydroxyalkyl amyloses can be separated from the hydroxyalkylation reaction medium in the solvent-change partitioning step. The initially water-insoluble hydroxyalkyl amylose can be used to prepare cold water-soluble hydroxyalkyl amyloses or hydroxyalkyl amylose films.

The cold water-soluble hydroxyalkyl amylose powders are prepared by dissolving initially water-insoluble hydroxyalkyl amyloses in water at temperatures in excess of 100° C., followed by either precipitating the hydroxyalkyl amylose powder from solution with an organic material or by evaporating the water on hot rolls or by spray drying. The cold water-soluble hydroxyalkyl amylose whose aqueous solutions are non-gelling has a molar substitution of at least 0.15, i.e., on an average 0.15 mole of alkylene oxide on each anhydroglucose unit of amylose. When the molar substitution is below 0.15, an aqueous solution of hydroxyalkyl amylose, which has been prepared by dissolving cold water-soluble hydroxyalkyl amylose in water, tends to form a gel at room temperature. Likewise, initially water-insoluble hydroxyalkyl amylose having a molar substitution below 0.15, which has been dissolved in water at elevated temperatures, tends to gel on cooling to room temperature. It is, accordingly, not pracitcal to cast films from hydroxyalkyl amylose, which has a molar substitution below 0.15, since its solutions tend to gel rapidly at room temperature.

The preferred cold water-soluble hydroxyalkyl amyloses of this invention have a molar substitution of at least about 0.19. At room temperature aqueous solutions of hydroxyalkyl amyloses, which have a molar substitution of about 0.15 to about 0.19, do have some tendency to gel or retrograde at concentrations of from about 10% to 20% by weight hydroxyalkyl amylose; on the other hand, aqueous solutions of hydroxyalkyl amylose, which have a molar substitution of at least about 0.19 do not gel or retrograde at these concentrations. However, the hydroxyalkyl amyloses, which have gelled or retrograded at the above concentrations readily dissolve in hot water.

The cold water-soluble, hydroxyalkyl amyloses of this invention, having a molar substitution of about 0.15 and above, are excellent film formers and have little or no tendency to gel or to retrograde in aqueous solutions. Two classes of films are formed. The first class, which has a molar substitution of about 0.40 and above, is water-soluble at room temperature. These films can be used to package bleach, soap, starch or other materials where it is desirable to dissolve the film packaging in water.

The second class of films, whose molar substitution ranges from 0.15–0.39, are water-insoluble at room temperature but soluble in boiling water. It is believed that retrogradation occurs during drying of these films. This insolubilization of the cast film is particularly surprising since the solutions from which the films are cast have virtually no tendency to gel or to retrograde. The films themselves are self-supporting and flexible with high tensile strength and are useful in many types of packaging.

The following examples are merely illustrative and should not be construed as limiting the scope of the invention.

Example 1

Sixty-nine and seven-tenths grams of amylose (64.8 grams on a dry solids basis or .4 mole) was slurried in 500 ml. of water. Eighty-three ml. of water was used to transfer the slurry to a 32 oz. beverage bottle. After cooling to between 5–8° C., 1.30 grams NaOH (1.80 ml. of a 50% solution) was added to the slurry. Allowing 1 gram for loss, 18.7 grams (approximately 0.4 mole) of ethylene oxide (at 5–8° C.) was poured into the weighed bottle from a graduated cylinder. Part of the ethylene oxide, which boils at around 11° C., flushed the lighter air out of the bottle and caused ice to form in the bottle before the bottle was capped with a butyl rubber-lined cap. The bottle was reweighed and tumbled for 16 hours in a water bath, which was maintained at 50° C. The suspension was then cooled to room temperature and neutralized with 5 N HCl to a pH of 7. A small portion of the sample was precipitated in excess acetone, washed with acetone and vacuum-oven dried. The remainder of the slurry was shaken to effect complete suspension, and about 10 ml. of the suspension was quickly poured through a long-stemmed funnel into a 15 x 20 x 250 mm. Pyrex Carius combustion tube. The tube was sealed and then heated for five minutes in a 150° C. oil bath, and the suspension was thereby converted to a clear viscous solution. It was noted that the solution did not gel and there was no evidence of retrogradation after the tube had been cooled to room temperature. This sample was subsequently poured into an aluminum foil dish. The water-insoluble film which formed on drying could be bent through 180° without breaking.

The balance of the slurry was placed in a three-liter jet cooker. The structure and operation of the jet cooker are discussed in detail in application Serial No. 790,487, filed February 2, 1959. The slurry was jet-cooked for 15 seconds at 150° C. and then cooled to room temperature at which it was a stable, clear, viscous solution. This solution was spray dried forming a white cold water-soluble powder. A small sample, which was analyzed by treatment with hydriodic acid, indicated that the hydroxyethyl amylose had a molar substitution of 0.38.

*Example 2*

A series of samples in seven-ounce beverage bottles was prepared in order to illustrate the effect of various ratios of ethylene oxide to amylose. Approximately 0.05 mole of amylose (8.46 grams, 7.86 grams on a dry solids basis) was slurried in 50 ml. water. Thirty mls. of water was used to transfer each slurry to a seven-ounce bottle. The bottles were cooled to between 5 and 8° C. and 0.16 gram of NaOH (4 ml. of 1 N solution) was added. The pH of all the samples was between 11 and 12. Allowing 1 gram for loss, the various mole quantities of ethylene oxide (at 5–8° C.) set forth in Table I were poured into each bottle. The bottles were capped with a butyl rubber-lined cap and tumbled end-over-end for 16 hours in a 50° C. water bath. Each slurry was cooled to room temperature and then neutralized to a pH of 7 with about 4 ml. 1 N HCl. Prior to neutralization sample 8 had a pH of 10.6 while the other samples had a pH of about 8. Ten ml. samples of each slurry were solubilized in a Carius tube in the manner described in Example 1 and then cooled to room temperature. The results are indicated in Table I.

TABLE I

| Run | Moles Ethylene Oxide Per Mole Amylose | Molar Substitution | Appearance of Neutral, Undiluted Hydroxyethyl Amylose Solution After Standing for Two Weeks at Room Temperature |
| --- | --- | --- | --- |
| 1 | .125 | .12 | White, rigid gel. |
| 2 | .25 | .16 | Soft gel. |
| 3 | .5 | .27 | Clear liquid. |
| 4 | 1.0 | .38 | Clear viscous liquid. |
| 5 | 2.0 | .76 | Do. |
| 6 | 4.0 | .72 | Do. |
| 7 | 8.0 | .19 | Clear thin liquid. |
| 8[1] | 8.0 | .57 | Clear viscous liquid. |

[1] In this run the bottle was purged with nitrogen prior to the addition of ethylene oxide.

Flexible films, which could be bent through an angle of 180° without breaking, were cast from solutions 4 thru 7. The films prepared from the solutions of runs 5 and 6 were soluble in water at room temperature. The films prepared from the solutions of runs 4 and 7 would not dissolve in water at room temperature, but did dissolve in boiling water after 5 minutes.

*Example 3*

This example illustrates the effect of varying both the catalyst-to-amylose and the alkylene oxide-to-amylose mole ratios on the gelling of hydroxy-alkyl amylose solutions. Runs 5 and 10 show the additional effect of an inert atmosphere on the gelling of hydroxyalkyl amylose solutions.

Fifteen samples of amylose (8.46 grams, 7.86 grams on dry basis) were run at 50° C. for 16 hours by the method set forth in Example 2, varying the concentration of the catalyst and of the ethylene oxide as set forth in Table II below.

TABLE II

| Run | Moles Ethylene Oxide Per Mole Amylose | Moles NaOH Per Mole Amylose | Appearance of Neutral, Undiluted Hydroxyethyl Amylose Solution After One Month at Room Temperature |
| --- | --- | --- | --- |
| 1 | .125 | .08 | White, rigid gel. |
| 2 | .125 | .16 | Do. |
| 3 | .25 | .08 | Soft gel. |
| 4 | .25 | .16 | Clear, viscous liquid. |
| 5[1] | .5 | .04 | Do. |
| 6 | .5 | .08 | Do. |
| 7 | .5 | .16 | Do. |
| 8 | 1.0 | .02 | White, rigid gel. |
| 9 | 1.0 | .04 | Do. |
| 10[1] | 1.0 | .04 | Clear, viscous liquid. |
| 11 | 1.0 | .08 | Do. |
| 12 | 2.0 | .02 | White, rigid gel. |
| 13 | 2.0 | .04 | Do. |
| 14 | 2.0 | .08 | Clear, viscous liquid. |
| 15 | 4.0 | .02 | White, rigid gel. |
| 16 | 4.0 | .04 | Do. |
| 17 | 4.0 | .08 | Clear, viscous liquid. |

[1] In these runs the bottles were purged with nitrogen prior to the addition of ethylene oxide. Flexible films were cast from solutions 4, 5, 6, 7, 10, 11, 14 and 17.

*Example 4*

This example illustrates the effect of temperature on the hydroxyalkylation. Seven samples of amylose (8.46 grams, 7.86 grams on a dry solids basis) were run at temperatures of from 30° C.–90° C. for 16 hours by the method set forth in Example 2 using 3.2 grams ethylene oxide (approximately .05 mole) and 0.16 gram NaOH. The results are set forth in Table III.

TABLE III

| Run | Temperature, ° C. | Appearance of Neutral, Undiluted Hydroxyethyl Amylose Solution After One Month at Room Temperature |
| --- | --- | --- |
| 1 | 30 | Clear, viscous liquid. |
| 2 | 40 | Do. |
| 3 | 50 | Do. |
| 4 | 60 | Do. |
| 5 | 70 | Do. |
| 6 | 80 | Clear, thin liquid. |
| 7 | 90 | Clear, thin, amber liquid. |

*Example 5*

This example illustrates the use of propylene oxide as the alkylene oxide. A slurry of approximately .05 mole amylose (8.46 grams, 7.86 grams on a dry solids basis) in a seven-ounce beverage bottle was prepared by the method of Example 2. After adding 0.16 gram NaOH, $N_2$ was bubbled through the suspension to remove all oxygen from the bottle. After 2.64 grams of 1,2-propylene oxide (5–8° C.) was added to the cold bottle (5–8° C.), it was capped with a butyl rubber-lined cap and tumbled end-over-end for 16 hours in a water bath maintained at 50° C. The bottle was cooled to room temperature and neutralized with approximately 4 ml. of 1 N HCl. A 10 ml. sample of the suspension was solubilized in a Carius tube by the method described in Example 1. The cooled solution was clear and viscous. A clear, flexible, water-insoluble film was prepared by pouring the solution into an aluminum foil dish and drying. Another sample of the suspension was filtered, washed in acetone and analyzed. The product had a molar substitution of 0.28.

*Example 6*

Example 5 was repeated using 3.08 grams commercial 1,2-butylene oxide instead of propylene oxide. The cooled Carious tube solution was clear. The product had a molar substitution of 0.29.

Various substituted alkylene oxides can be reacted in the same manner such as styrene oxide, 9,10-epoxystearic acid, 3-(diethylamino)1,2-epoxy propane, epoxidized soybean acids, etc. These compounds are representative of alkylene oxides substituted with aryl groups, carboxyl groups and amino groups.

*Example 7*

This example illustrates the use of potassium hydroxide as the alkaline catalyst.

Example 2, run #4, was repeated using as a catalyst 0.23 gram KOH instead of 0.16 gram NaOH. The cooled Carious tube solution was clear and viscous. The products had a molar substitution of 0.38 as did the product of Example 2, run #4.

*Example 8*

This example illustrates the catalytic effect of potassium hydroxide, sodium hydroxide, sodium alkoxide and water where an organic solvent is employed as the suspension medium. Seven hundred and twenty-four grams of acetone-wet amylose (200 grams amylose dry basis) was slurried with 500 ml. isopropyl alcohol, filtered, pressed to remove excess solvent and reslurried with 600 ml. isopropyl alcohol. The slurry was weighed and divided in eight equal portions, which were added to 12-ounce beverage bottles (25 grams amylose on dry solids basis in each bottle). After the addition of catalyst (see Table IV), each of the bottles was evacuated until the isopropyl alcohol boiled and then brought back to atmospheric pressure with $N_2$ gas. Nine grams ethylene oxide (5–8° C.) was added to each bottle (5–8° C.). The bottles were capped and then tumbled end-over-end in a 50° C. water bath for the time indicated. The contents were neutralized with acetic acid and filtered. The separated solid was washed with acetone and dried in a vacuum oven. The products were water-insoluble, but after treatment in a jet cooker, as described in Example 2, and spray drying, they were cold water-soluble. The results are displayed in Table IV.

TABLE IV

| Run | Catalyst Added | Moles Catalyst Per Mole Amylose | Time in Hours | Molar Substitution |
|---|---|---|---|---|
| 1 | 1 gram sodium dissolved in 60 grams isopropyl alcohol. | .28 | 4 | .48 |
| 2 | 3 grams NaOH (4 ml. of 50% aqueous NaOH diluted with 5 ml. of additional water). | .49 | 4 | 1.1 |
| 3 | 2 grams KOH dissolved in 30 ml. isopropyl alcohol. | .23 | 4 | .36 |
| 4 | 2 grams KOH dissolved in 30 ml. isopropyl alcohol and 5 ml. water. | .23 | 4 | .69 |
| 5 | 1 gram Na dissolved in 60 grams isopropyl alcohol. | .28 | 20 | 1.2 |
| 6 | 3 grams NaOH (4 ml. of 50% aqueous NaOH diluted with 5 ml. of additional water). | .49 | 20 | .84 |
| 7 | 2 grams KOH in 30 ml. isopropyl alcohol. | .23 | 20 | 1.0 |
| 8 | 2 grams KOH in 30 ml. isopropyl alcohol and 5 ml. water. | .23 | 20 | 1.1 |

*Example 9*

This example illustrates the results obtained with a relatively high ratio of alkaline catalyst to amylose.

Three samples of amylose (8.46 grams, 7.86 grams on a dry solids basis) were run at 50° C. for 16 hours using 2.6 ml. of 50% NaOH (approximately 0.8 mole NaOH per mole of amylose), by the method set forth in Example 2. The results are set forth in Table V.

TABLE V

| Run | Moles Ethylene Oxide Per Mole Amylose | Appearance of Neutral, Undiluted Hydroxyethyl Amylose Solution After One Month at Room Temperature |
|---|---|---|
| 1 | .25 | Clear thin liquid. |
| 2 | .50 | Do. |
| 3 | 1.00 | Do. |

*Example 10*

This example illustrates the results obtained with .05 mole of alkaline catalyst per mol of amylose at 70° C.

An aqueous slurry of approximately 0.04 mole amylose (48.7 grams aqueous slurry, 6.48 grams on a dry solids basis) in a seven-ounce beverage bottle was diluted with 44 ml. water. Two mls. 1 N NaOH (0.05 mole per mole of amylose) was added to the bottle. After cooling to between 5–8° C., 3.52 grams of ethylene oxide was added to the bottle. The capped bottle was tumbled end-over-end at 70° C. for 16 hours, cooled, and then neutralized. The sample was heated in a Carious tube as described in Example 1. The cooled Carious tube sample was a clear, viscous solution at room temperature.

*Example 11*

This example illustrates the preparation of non-gelling hydroxyalkyl amylose solutions where the hydroxyalkylation is completed in a relatively short time (1½ or 2 hours).

Two samples of amylose (8.46 grams, 7.86 grams on a dry solids basis) were run at 50° C. by the method set forth in Example 2 using 3.2 grams ethylene oxide and 0.16 gram NaOH. After reacting for 1½ hours one sample was neutralized. The second sample was neutralized after two hours. Each sample gave a clear, colorless solution after Carius tube heating. These solutions did not gel on standing two weeks at room temperature.

*Example 12*

This example illustrates the use of an open vessel. One hundred and ten grams of amylose (100 grams on a dry solids basis or .62 mole) was stirred into a 2 liter resin kettle containing 800 ml. of water. The resin kettle was equipped with a dry ice reflux condenser and a stirrer. After .1 mole of NaOH was added to the kettle, the kettle was evacuated with an aspirator pump and the air was replaced with nitrogen. After 5.43 grams (.17 mole) of ethylene oxide was added to the kettle, it was placed in a water bath, which was maintained at 50° C. for 16 hours. The reaction mixture was neutralized to pH 7 with about 21 ml. of 5 N HCl. The hydroxyalkyl amylose was filtered and then washed with water. The isolated hydroxyalkyl amylose had a molar substitution of .18. An aqueous solution of this product, which had been prepared by heating in a Carious tube one gram of product in 10 ml. water at 150° C., did not gel or retrograde on cooling to room temperature.

*Example 13*

Example 12 was repeated using 32.6 grams ethylene oxide (.75 mole) instead of 5.43 grams ethylene oxide. The hydroxyalkyl amylose had a molar substitution of .70; the cooled Carious tube solution was clear.

*Example 14*

The following table illustrates the comparative physical properties of hydroxyethyl amylose films, a hydroxyethyl starch film and films formed from commercial cellulose products. All of these films were cast on glass from neutral solutions.

TABLE VI

| Film | Molar Substitution | Film Thickens in Mils | Tensile Strength in p.s.i. | Percent Elongation at Break |
|---|---|---|---|---|
| Hydroxyethyl Starch [1] | 0.5 | 1.3 | 1,000 | (²) |
| Hydroxyethyl Amylose | 0.38 | 2.1 | 4,540 | 24 |
| Do | 0.38 | 2.5 | 4,830 | 18 |
| Do | 0.38 | 2.9 | 4,770 | 13 |
| Do | 0.38 | 3.4 | 4,720 | 12 |
| Do | 0.43 | 4.0 | 4,760 | 8 |
| Do | 0.43 | 4.8 | 4,480 | 10 |
| Do | 0.43 | 5.8 | 4,170 | 12 |
| Do | 0.90 | 2.7 | 3,490 | 23 |
| Do | 0.90 | 3.2 | 3,360 | 24 |
| Hydroxyethyl Cellulose [3] | 1.04 | 3.5 | 4,000 | 37 |
| Do.[4] | 1.61 | 2.9 | 2,570 | 62 |
| Do.[4] | 1.61 | 3.3 | 2,690 | 66 |

[1] The hydroxyethyl starch values were taken from vol. 37, No. 5, page 667 of Cereal Chemistry, September 1960.
[2] Too small to measure.
[3] Cellosize WP-09.
[4] Natrosol.

As is well-known, the analysis for oxyethylene units is not completely accurate. Accordingly, the numerical value of the molar substitutions recited in the specification and claims is to be interpreted as being within experimental error.

Since many embodiments of this invention may be made and since many changes may be made in the embodiments described, the foregoing is to be interpreted as illustrative only and our invention is defined by the claims appended hereafter.

We claim:
1. The method of preparing hydroxyalkyl amylose, which comprises the steps of reacting at a temperature of from about 30° C. to 90° C. an alkaline suspension of amylose with at least 0.20 mole of a vic-epoxy compound per mole of amylose to produce undissolved hydroxyalkyl amylose having an M.S. of at least 0.15, wherein the suspending liquid is a solvent for the vic-epoxy compound, neutralizing the suspension, and isolating undissolved hydroxyalkyl amylose having an M.S. of at least 0.15.

2. The method of preparing hydroxyalkyl amylose which comprises the steps of reacting at a temperature of from about 30° C. to 90° C. an alkaline suspension of amylose with at least 0.20 mole of a vic-epoxy compound per mole of amylose to produce undissolved hydroxyalkyl amylose having an M.S. of at least 0.15, wherein the suspending liquid is a solvent for the vic-epoxy compound and is selected from the group consisting of water, an alcohol and an ether, neutralizing the suspension and isolating undissolved hydroxyalkyl amylose having an M.S. of at least 0.15.

3. The method of claim 2 wherein the vic-epoxy compound is ethylene oxide.

4. The method of claim 2 wherein the vic-epoxy compound is propylene oxide.

5. The method of preparing cold water-soluble hydroxyalkyl amylose, which comprises the steps of reacting at a temperature of from about 30° C. to about 90° C. an alkaline suspension of amylose with at least 0.20 mole of a vic-epoxy compound per mole of amylose, wherein the suspending liquid is a solvent for the vic-epoxy compound, neutralizing said alkaline suspension, separating the insoluble hydroxyalkyl amylose from the suspending liquid, dispersing the hydroxyalkyl amylose in water, heating the hydroxyalkyl amylose dispersion to a temperature above 100° C. until the hydroxyalkyl amylose dissolves and then recovering the hydroxyalkyl amylose.

6. The method of claim 5 wherein the suspending solvent for the vic-epoxy compound is selected from the group consisting of water, an alcohol and an ether.

7. The method of claim 5 wherein the vic-epoxy compound is ethylene oxide.

8. The method of claim 5 wherein the vic-epoxy compound is propylene oxide.

9. The method of preparing cold water-soluble hydroxyalkyl amylose, which comprises the steps of reacting at a temperature of from about 30° C. to about 90° C. an alkaline, aqueous suspension of amylose with at least 0.20 mole of a vic-epoxy compound per mole of amylose, neutralizing said alkaline suspension, heating the suspension to a temperature above 100° C. until the hydroxyalkyl amylose dissolves and then recovering the hydroxyalkyl amylose.

10. The method of claim 9 wherein the vic-epoxy compound is ethylene oxide.

11. The method of claim 9 wherein the vic-epoxy compound is propylene oxide.

12. The method of preparing hydroxyalkyl amylose which comprises the steps of reacting a suspension of amylose containing at least 0.04 mole of alkaline catalyst per mole of amylose with at least 0.20 mole of a vic-epoxy compound per mole of amylose to produce undissolved hydroxyalkyl amylose having an M.S. of at least 0.15, neutralizing the resultant suspension and isolating undissolved hydroxyalkyl amylose having an M.S. of at least 0.15.

13. A readily isolable hydroxyalkyl amylose prepared by the method of claim 1 having a molar substitution of at least 0.15, which is substantially water-insoluble at temperatures up to 100° C. and which forms at temperatures in excess of 100° C. an aqueous solution which neither gels nor retrogrades on subsequent cooling to room temperature.

14. A readily isolable hydroxyethyl amylose prepared by the method of claim 1 having a molar substitution of at least 0.15, which is substantially water-insoluble at temperatures up to 100° C. and which forms at temperatures in excess of 100° C. an aqueous solution which neither gels nor retrogrades on subsequent cooling to room temperature.

15. The method of preparing hydroxyalkyl amylose, which comprises the steps of reacting at a temperature of from about 30° C. to 90° C. an alkaline, aqueous suspension of amylose with at least 0.20 mole of a vic-epoxy compound per mole of amylose to produce undissolved hydroxyalkyl amylose having an M.S. of at least 0.15 and isolating undissolved hydroxyalkyl amylose having an M.S. of at least 0.15.

16. The method of claim 5, wherein said hydroxyalkyl amylose is recovered by distributing the hydroxyalkyl amylose solution as a thin layer on a surface and then forming a self-supporting film by evaporating liquid from the solution.

17. The method of claim 9, wherein said hydroxyalkyl amylose is recovered by distributing the hydroxyalkyl amylose solution as a thin layer on a surface and then forming a self-supporting film by evaporating liquid from the solution.

References Cited in the file of this patent

UNITED STATES PATENTS

| | | |
|---|---|---|
| 2,516,634 | Kesler et al. | July 25, 1950 |
| 2,588,463 | Balassa | Mar. 11, 1952 |
| 2,599,620 | Filbert | June 10, 1952 |
| 2,608,723 | Wolff et al. | Sept. 2, 1952 |
| 2,656,571 | Davis et al. | Oct. 27, 1953 |
| 2,744,894 | Benedict et al. | May 8, 1956 |
| 2,822,581 | Muetgeert et al. | Feb. 11, 1958 |
| 3,036,935 | Lolkema et al. | May 29, 1962 |
| 3,038,895 | Rutenberg et al. | June 12, 1962 |

FOREIGN PATENTS

| | | |
|---|---|---|
| 1,204,376 | France | Aug. 10, 1959 |

OTHER REFERENCES

"Cereal Science Today," volume 3, No. 8, October 1958, pages 206–209.